United States Patent
Lin et al.

(10) Patent No.: US 9,470,965 B2
(45) Date of Patent: Oct. 18, 2016

(54) PROJECTION SYSTEM

(71) Applicants: Qisda Optronics (Suzhou) Co., Ltd., Suzhou (CN); Qisda Corporation, Taoyuan (TW)

(72) Inventors: Ming-Kuen Lin, Taoyuan (TW); Tsung-Hsun Wu, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 203 days.

(21) Appl. No.: 14/527,770

(22) Filed: Oct. 30, 2014

(65) Prior Publication Data
US 2015/0124226 A1    May 7, 2015

(30) Foreign Application Priority Data
Nov. 1, 2013    (TW) ............... 102139835 A

(51) Int. Cl.
*G03B 21/20*    (2006.01)
*G03B 21/00*    (2006.01)
*G03B 33/06*    (2006.01)

(52) U.S. Cl.
CPC .......... *G03B 21/208* (2013.01); *G03B 21/005* (2013.01); *G03B 21/2013* (2013.01); *G03B 33/06* (2013.01); *G03B 21/2066* (2013.01)

(58) Field of Classification Search
CPC ............ G03B 21/2013; G03B 21/208; G03B 21/2033; G02B 6/0068; G02B 6/0018; G02B 6/0028; G02B 5/04; G02B 5/08; G02B 19/00; G02B 6/00; G02B 27/09; G02B 27/10; G02B 27/14; G02B 7/18; H04N 9/3164; F21V 33/00; F21V 5/00; F21S 2/00

See application file for complete search history.

(56) References Cited

U.S. PATENT DOCUMENTS

| | | | |
|---|---|---|---|
| 7,182,468 B1 * | 2/2007 | Haven ................ | G03B 21/208 348/E9.027 |
| 2001/0048562 A1 * | 12/2001 | Bartlett ................ | G02B 27/143 359/636 |
| 2008/0068819 A1 | 3/2008 | Ming-Kuen | |
| 2009/0009895 A1 * | 1/2009 | Huang ............... | G02B 27/0994 359/834 |
| 2013/0308103 A1 * | 11/2013 | Yamamoto ......... | G02B 27/0905 353/30 |

* cited by examiner

*Primary Examiner* — Bao-Luan Le
*Assistant Examiner* — Christopher Lamb, II

(57) ABSTRACT

A projection system includes a projection lens, an image modulation device, a light-guiding rod and two light sources. The light-guiding rod is defined with an axial direction and has a first end and a second end. The first end has a transmission surface and a reflection surface. The ratios of the widths of the transmission and reflection surfaces to the panel width of the image modulation device are 0.13~0.35. The lights of the first and second light sources are incident into the light-guiding rod through the transmission surface and onto a first side surface and reflected into the light-guiding rod through the first reflection surface, respectively. The light-guiding rod homogenizes the incident lights and transmits the homogenized light to the image modulation device through the second end thereby forming an image light. The projection lens projects the image light.

12 Claims, 8 Drawing Sheets

PROJECTION SYSTEM

FIELD OF THE INVENTION

The present invention relates to a projection system, and more particularly to a projection system having multiple light sources.

BACKGROUND OF THE INVENTION

Most of the current project systems have single light source. Thus, to increasing the brightness of projected images, there is no much choice but to increase the illumination of a light source. In generally, the increase of illumination is achieved by employing light sources with higher power; however, a higher-power light source may result in a higher temperature, which may consequentially affect the light-emitting efficiency or even be detrimental to the light source lifespan. To overcome this issue, multi-light-source projection system is introduced in current market now. In a multi-light-source projection system, the lights generated by more than one light source are directed into one signal light-guiding rod first and then are mixed by the light-guiding rod thereby increasing the brightness of projected images. However, the lights emitted from the more than one light source may not have a certain homogenization and present a specific distribution characteristic (e.g., a Gaussian distribution); and conventionally, the light collection design for multi light sources are implemented as having their light-output directions toward the light-guiding rod only but without considering the specific light distribution. As a result, the light projected onto an image modulation device from a light-output end of the light-guiding rod may not be sufficiently homogenized, and accordingly the brightness of the projected image may have poor uniformity.

SUMMARY OF THE INVENTION

Therefore, one object of the present invention is to provide a projection system capable of directing, through a transmission surface and a reflection surface, lights generated by a plurality of light sources and also capable of maintaining the light distribution projected from a light-guiding rod to have a certain homogenization by adjusting the widths of the transmission surface and the reflection surface.

The present invention further provides a projection system, which includes a projection lens, an image modulation device, a light-guiding rod, a first light source and a second light source. The projection lens is configured to project an image light. The image modulation device has a panel width and is configured to form the image light. The light-guiding rod is configured to receive and homogenize a plurality of lights. The light-guiding rod is defined with an axial direction and has a first end and a second end. The first end has a transmission surface and a first reflection surface located on a first side of the transmission surface. A normal direction of the first reflection surface and the axial direction have a first angle formed therebetween. The transmission surface substantially is perpendicular to the axial direction. The first reflection surface has a first width. The transmission surface has a second width. Both of a ratio of the first width to the panel width and a ratio of the second width to the panel width are from 0.13 to 0.35. The first light source is configured to emit a first light. The first light is emitted into the light-guiding rod through the transmission surface. The second light source is configured to emit a second light. The second light is incident onto a first side surface of the light-guiding rod and reflected into the light-guiding rod through the first reflection surface. The first light and the second light are homogenized by the light-guiding rod and transmitted the homogenized light to the image modulation device through the second end, and projection lens projects the image light formed by the image modulation device.

Compared with the prior art, through controlling the ratios of the transmission surface and the reflection surface to the panel width of the image modulation device in the projection system of the present invention, the luminous fluxes on the transmission surface and the reflection surface can be maintained to have a certain homogenization, the light (mixed by the first light and the second light) projected to the image modulation device can have an even distribution and the image brightness generated by the projected light can have a higher homogenization. Therefore, the projection system of the present invention can effectively solve the problems, such as the light projected by the light-guiding rod having insufficient homogenization and the brightness of the projected image having poor uniformity, caused by the conventional light collection design for multi light sources without considering the light-out distribution.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
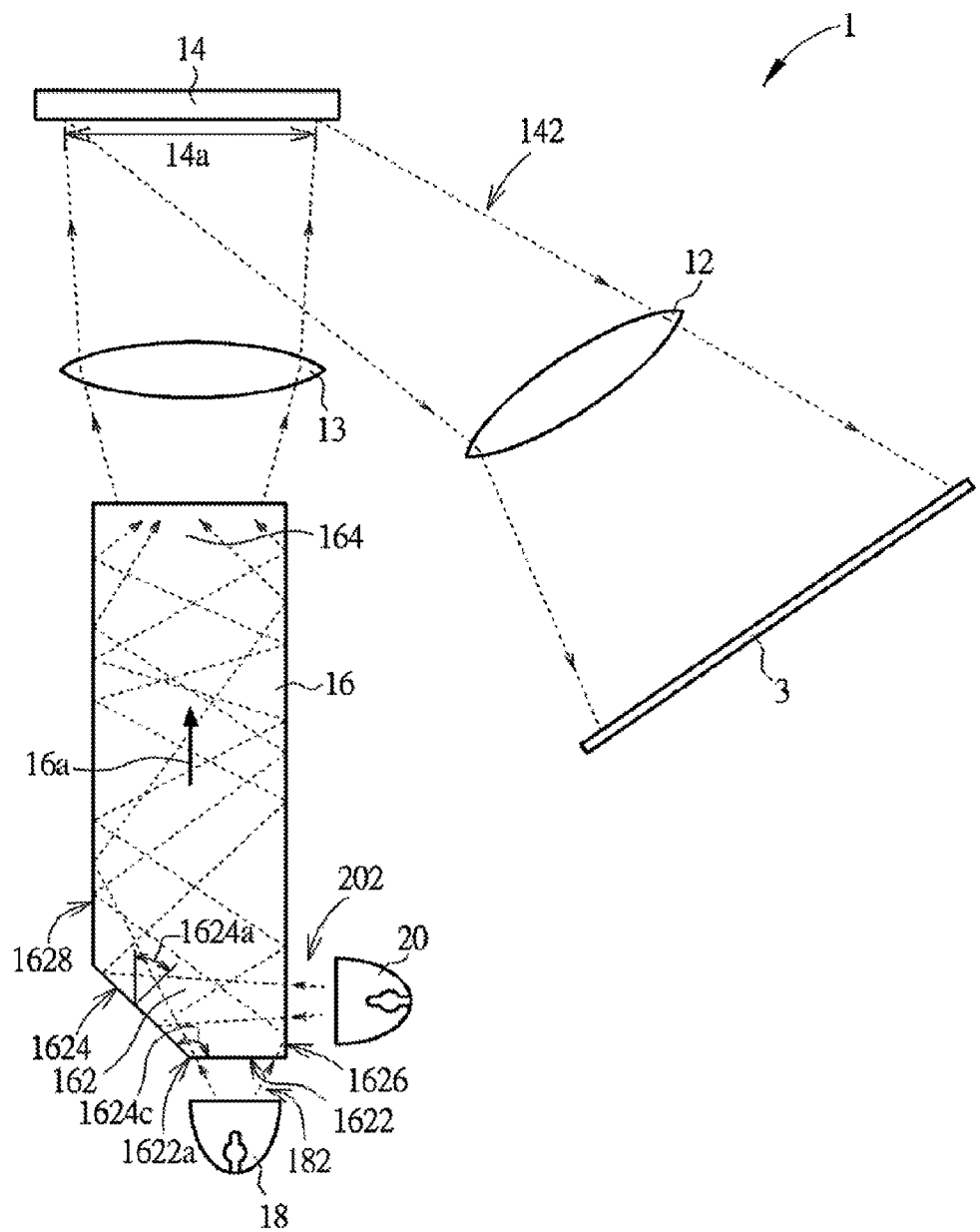
FIG. 1 is a schematic view of a projection system in accordance with a first embodiment of the present invention.

FIG. 1 is a schematic view of a projection system in accordance with a first embodiment of the present invention. As shown in FIG. 1, the projection system 1 in the present embodiment includes a projection lens 12, an image modulation device 14, a light-guiding rod 16, a first light source 18 and a second light source 20. The first light source 18 and the second light source 20 are configured to generate a first light 182 and a second light 202, respectively. Once receiving the first light 182 and the second light 202, the light-guiding rod 16 homogenizes and mixes the first light 182 and the second light 202 and then transmits the homogenized and mixed light onto the image modulation device 14. The image modulation device 14 receives the light from the light-guiding rod 16 and forms an image light 142 corresponding to image data. The projection lens 12 projects the image light 142 onto a screen 3 thereby forming an image.

Figure 2:
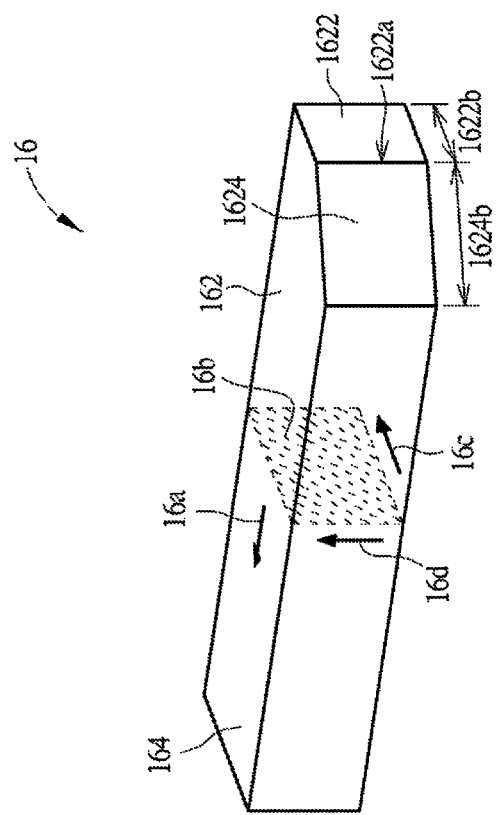
FIG. 2 is a perspective view of a light-guiding rod in accordance with an embodiment of the present invention.
Figure 3:
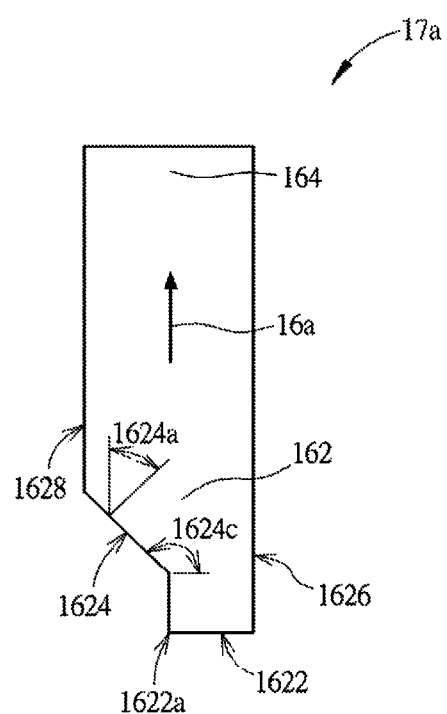
FIG. 3 is a schematic view of a light-guiding rod in accordance with another embodiment of the present invention.

Next, please refer to FIG. 2, which is a perspective view of a light-guiding rod in accordance with an embodiment of the present invention. As shown, the light-guiding rod 16 in the present embodiment substantially has a cylindrical structure defined with an axial direction 16a. The light-guiding rod 16 extends in the axial direction 16a, and has a rectangular cross-section 16b (indicated by dotted lines). The rectangular cross-section 16b is defined with a width direction 16c (i.e., the longer-edged direction of the rectangular cross-section 16b) and a height direction 16d (i.e., the shorter-edged direction of the rectangular cross-section 16b). The light-guiding rod 16 has a first end 162 and a second end 164. Specifically, the light-guiding rod 16 receives and homogenizes a plurality of lights (e.g., the first light 182 and the second light 202 shown in FIG. 1) through the first end 162 thereof and then transmits out the homogenized and mixed lights through the second end 164 thereof. The first end 162 has a transmission surface 1622 and a first reflection surface 1624; wherein the first reflection surface 1624 is formed on a first side 1622a of the transmission surface 1622. The normal direction of the first reflection surface 1624 and the axial direction 16a have a first angle 1624a formed therebetween. In one embodiment, the aforementioned first angle 1624a is 45 degrees, as illustrated in FIG. 3. The transmission surface 1622 is substantially perpendicular to the axial direction 16a. The first light 182 is incident into the light-guiding rod 16 through the transmission surface 1622. The second light 202 is incident onto a first side surface 1626 of the light-guiding rod 16 and then is reflected into the light-guiding rod 16 through the first reflection surface 1624. After being homogenized, the first light 182 and the second light 202 are emitted out through the second end 164 of the light-guiding rod 16 and then are projected onto the image modulation device 14 through a plurality of lenses 13 (herein only one lens is exemplified and shown in FIG. 1). In one embodiment, the image modulation device 14 is a digital micro-mirror device (DMD); however, the image modulation device of the present invention is not limited thereto. It is understood that the distribution area of the first light 182 and the second light 202 on the micro-mirrors of the DMD is rectangular due to the fact that the light-guiding rod 16 substantially has a cylindrical structure. According to the image data, the image modulation device 14 forms the image light 142 from the mixed first light 182 and second light 202 through a control of the ON/OFF of the micro-mirrors of the DMD. The image light 142 is then projected onto the screen 3 through the projection lens 12 thereby forming an image. In general, the aspect ratio of the cross-section (or, the light-output surface) of the second end 164 of the light-guiding rod 16 corresponds to that of the image modulation device 14, but the area of the cross-section of the second end 164 is smaller than that of the image modulation device 14 due to the magnification of the lens 13. The lens 13 adjusts the movement angle of the homogenized and mixed first light 182 and second light 202 and projects lights onto the micro-mirrors of the DMD.

As shown in FIG. 1, the image modulation device 14 has a panel width 14a (i.e. the width of the distribution area of the micro-mirrors of the DMD or the longer edge of the aforementioned rectangular distribution area formed by the first light 182 and the second light 202). The first reflection surface 1624 has a first width 1624b in a direction perpendicular to the height direction 16d of the rectangular cross-section 16b. The transmission surface 1622 has a second width 1622b in the width direction 16c of the rectangular cross-section 16b. Both of the width ratio of the first width 1624b to the panel width 14a and the width ratio of the second width 1622b to the panel width 14a are within a range from 0.13 to 0.35. When the light-output distributions, relative to the light-output directions, of the first light source 18 and the second light source 20 present a Gaussian distribution, the light with higher intensity and higher homogenization corresponds to the central part of the Gaussian distribution can be directed into the light-guiding rod 16 and the luminous fluxes on the transmission surface 1622 and the first reflection surface 1624 can be maintained as a certain homogenization by the control of the aforementioned respective width ratios. Consequentially, the light, mixed of the first light 182 and the second light 202 and projected from the second end 164 of the light-guiding rod 16 onto the image modulation device 14, has a higher homogenization and image brightness, and the image generated by the image light 142 projected on the screen 3 also has a higher homogenization. Thus, the light-guiding rod 16 of the first embodiment of the present invention can capture the light emitted from the first light source 18 and the second light source 20 more efficiently and the luminous fluxes on the transmission surface 1622 and the first reflection surface 1624 thereof can be maintained as a certain homogenization. As a result, the overall brightness and the homogenization are improved in the projection system 1 of the first embodiment of the present invention.

It is to be noted that aforementioned width ratio must be selected appropriately. Specifically, if a relatively-small width ratio is selected, only the central portion of the light emitted from the light source 18 or the light source 20 can be captured and accordingly a relatively-large portion of light is abandoned. As a result, too much light energy is wasted; the improved brightness output and the increased power input are disproportionate; and the projection system 1 with multiple light sources structure in the present embodiment may have an input power usage even lower than that of a single light source system. On the contrary, if a relatively-large width ratio is selected, the luminous flux on the transmission surface 1622 or the first reflection surface 1624 may have a lower homogenization due to the characteristic of the Gaussian distribution; consequentially, the light projected onto the image modulation device 14 as well as the brightness of the projected image have lower homogenizations. In addition, the element size of the light-guiding rod 16 corresponds to the width ratio; accordingly, the related optical devices (such as the lens 13) also have relatively-large element sizes. As a result, the projection system 1 in the present embodiment may have a relatively-large size, which may lead to a higher manufacturing cost.

In the light-guiding rod 16, the first reflection surface 1624 and the transmission surface 1622 have a third angle 1624c formed therebetween in the present embodiment. The third angle 1624c is within a range from 90 degrees to 180 degrees. In one embodiment, the third angle 1624c is 135 degrees. Because the light intensity has a Gaussian distribution and generally the digital micro-mirror device commonly used in industry has a ratio about 4:3, 16:10 or 16:9, the light-output surface (the cross-section of the second end 164 of the light-guiding rod 16) and the two light-input surfaces (the transmission surface 1622 and the first reflection surface 1624) have the same height in the height direction 16d of the rectangular cross-section 16b. In addition, the aforementioned two light-input surfaces may substantially have square shapes; thus, the higher-intensity and higher-homogenization light can be captured and directed into the light-guiding rod 16 more efficiently thereby increasing the light guiding efficiency of the light-guiding rod 16. The light-guiding rod 16 further has a second side surface 1628 which is opposite to the first side surface 1626. The two side edges of the first reflection surface 1624 are adjacent and connected to the transmission surface 1622 and the second side surface 1628, respectively; however, the present invention is not limited thereto. FIG. 3 is a schematic view of a light-guiding rod in accordance with another embodiment of the present invention. As shown, the light-guiding rod 17a in the illustrated embodiment of FIG. 3 has a structure similar to that of the light-guiding rod 16 of FIG. 2. The main difference between the two light-guiding rods is that in the light-guiding rod 17a, the first reflection surface 1624 is not adjacent and connected to the transmission surface 1622. In addition, it is understood that the light-guiding rod 17a may be used in the projection system 1 of FIG. 1 for replacing the light-guiding rod 16.

Figure 4:
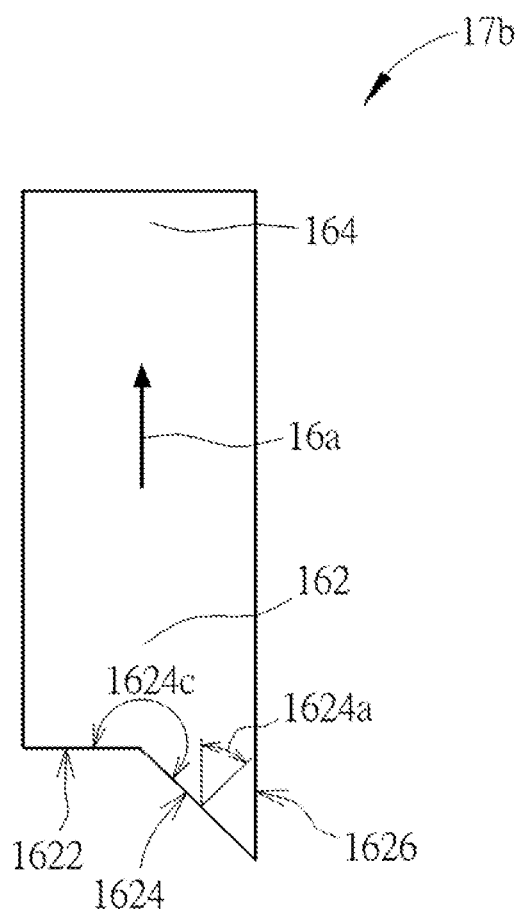
FIG. 4 is a schematic view of a light-guiding rod in accordance with another embodiment of the present invention.
Figure 5:
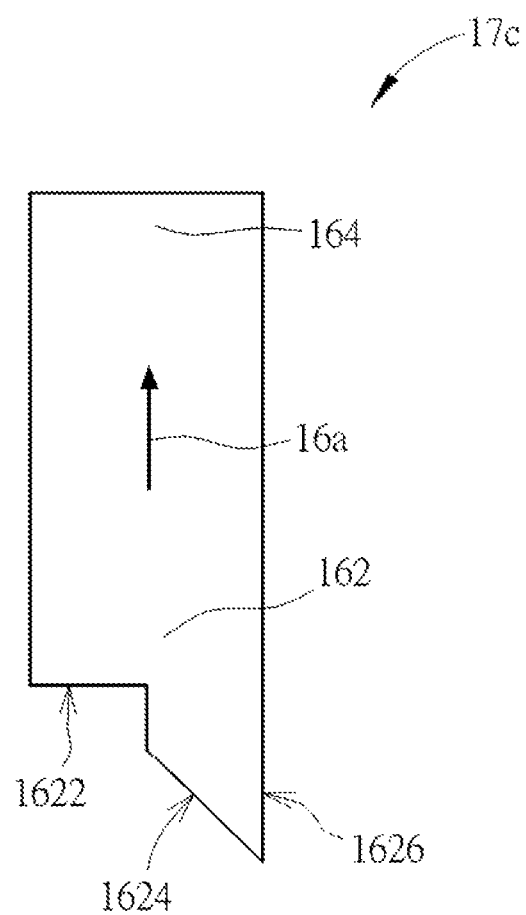
FIG. 5 is a schematic view of a light-guiding rod in accordance with another embodiment of the present invention.

As shown in FIG. 1, the first side surface 1626 and the first reflection surface 1624 are formed on opposite sides of the transmission surface 1622, respectively; however, the present invention is not limited thereto. FIG. 4 is a schematic view of a light-guiding rod in accordance with another embodiment of the present invention. As shown, the light-guiding rod 17b in the illustrated embodiment of FIG. 4 has a structure similar to that of the light-guiding rod 16 of FIG. 2. The main difference between the two light-guiding rods is that in the light-guiding rod 17b, the first side surface 1626 and the first reflection surface 1624 are formed on the same side of the transmission surface 1622. In addition, it is understood that the light-guiding rod 17b may be used in the projection system 1 of FIG. 1 for replacing the light-guiding rod 16. In the light-guiding rod 17b, the first reflection surface 1624 and the transmission surface 1622 have a third angle 1624c formed therebetween in the present embodiment. The third angle 1624c is within a range from 180 degrees to 270 degrees. In one embodiment, the third angle 1624c is 225 degrees. The two side edges of the first reflection surface 1624 are adjacent and connected to the transmission surface 1622 and the first side surface 1626, respectively; however, the present invention is not limited thereto. FIG. 5 is a schematic view of a light-guiding rod in accordance with another embodiment of the present invention. As shown, the light-guiding rod 17c in the illustrated embodiment of FIG. 5 has a structure similar to that of the light-guiding rod 17b of FIG. 4. The main difference between the two light-guiding rods is that in the light-guiding rod 17c, the first reflection surface 1624 is not adjacent and connected to the transmission surface 1622. In addition, it is understood that the light-guiding rod 17c may be used in the projection system 1 of FIG. 1 for replacing the light-guiding rod 16.

Figure 6:
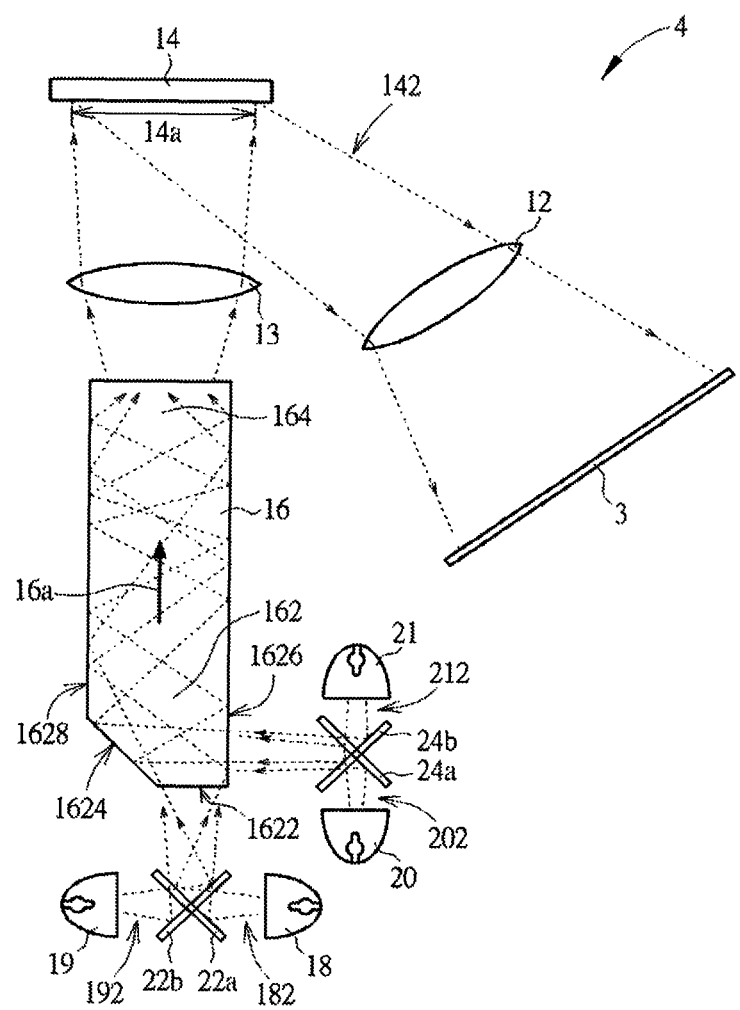
FIG. 6 is a schematic view of a projection system in accordance with a second embodiment of the present invention.

In the projection system 1, the transmission surface 1622 corresponds to one light source 18 and the first reflection surface 1624 corresponds to one light source 20; however, the present invention is not limited thereto. FIG. 6 is a schematic view of a projection system in accordance with a second embodiment of the present invention. As shown, the projection system 4 in the illustrated embodiment of FIG. 6 has a structure similar to that of the projection system 1 in the first embodiment of FIG. 1. Thus, the elements/units having the same mark/label number in FIGS. 1 and 6 have the similar function and structure, and no redundant detail is to be given herein. Compared with the projection system 1 of FIG. 1, the projection system 4 in the second embodiment further includes a fourth light source 19, a fifth light source 21, a first reflection member 22a, a second reflection member 22b, a third reflection member 24a and a fourth reflection member 24b. The first reflection member 22a and the second reflection member 22b are disposed to be adjacent to the transmission surface 1622. In one embodiment, specifically, the first reflection member 22a and the second reflection member 22b are interlaced from top to bottom. The fourth light source 19 is configured to emit a fourth light 192. The first light 182 is reflected by the first reflection member 22a thereby being emitted into the light-guiding rod 16 through the transmission surface 1622. The fourth light 192 is reflected by the second reflection member 22b thereby being emitted into the light-guiding rod 16 through the transmission surface 1622. The third reflection member 24a and the fourth reflection member 24b are disposed to be adjacent to the first side surface 1626. In one embodiment, specifically, the third reflection member 24a and the fourth reflection member 24b are interlaced from top to bottom. The fifth light source 21 is configured to emit a fifth light 212. The second light 202 is reflected onto the first side surface 1626 by the third reflection member 24a and then is reflected into the light-guiding rod 16 through the first reflection surface 1624. The fifth light 212 is reflected onto the first side surface 1626 by the fourth reflection member 24b and then is reflected into the light-guiding rod 16 through the first reflection surface 1624. Thus, the transmission surface 1622 corresponds to two light sources 18, 19 and the first reflection surface 1624 corresponds to two light sources 20, 21; and consequentially, more lights can be captured in the projection system 4, a higher light-output intensity is obtained at the second end 164 of the light-guiding rod 16 and a higher brightness is obtained in the projected image.

Figure 7:
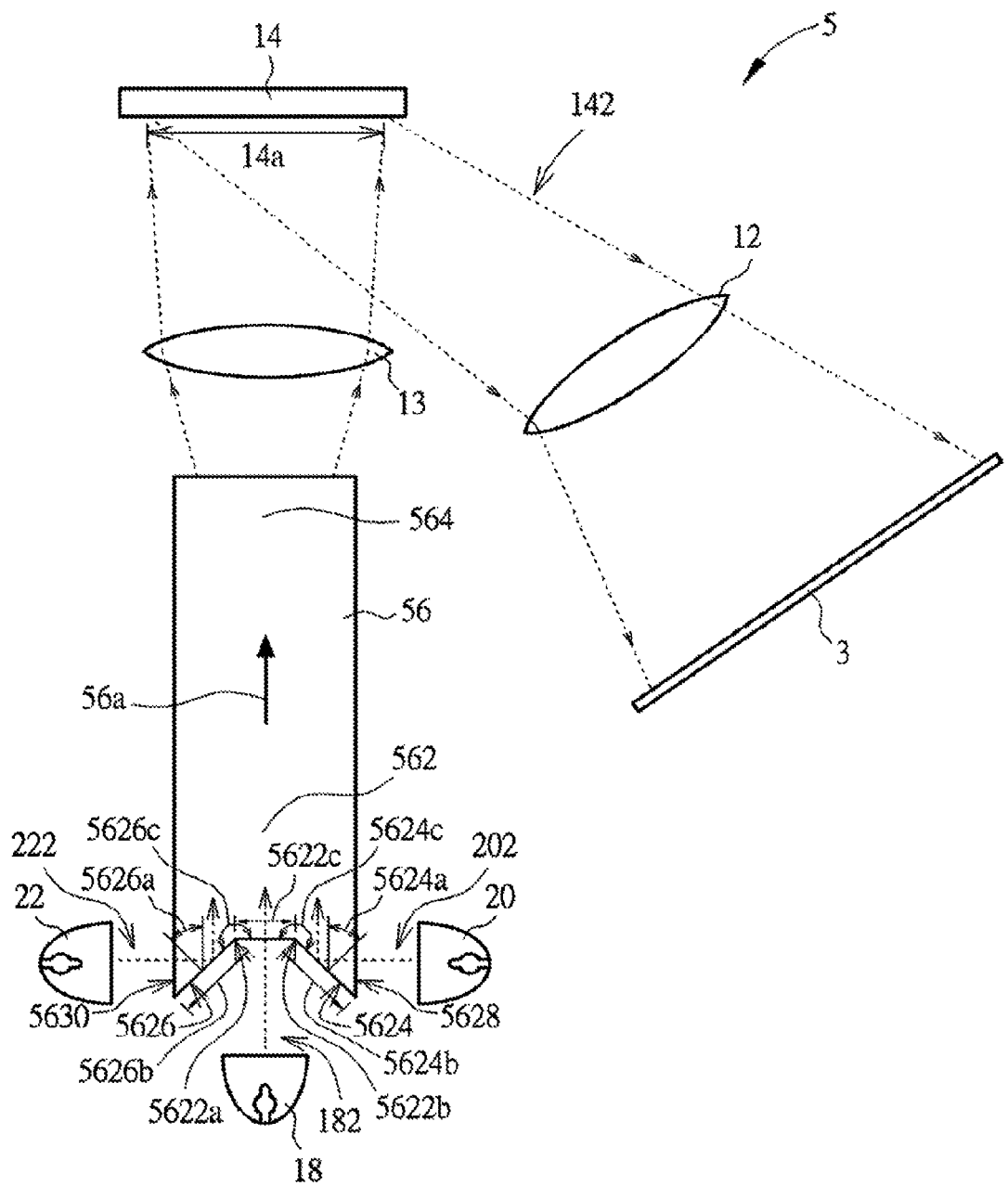
FIG. 7 is a schematic view of a projection system in accordance with a third embodiment of the present invention.

In the aforementioned embodiments, the first end 162 of the light-guiding rod 16 has two light-capture interfaces (i.e., the transmission surface 1622 and the first reflection surface 1624) only; however, the present invention is not limited thereto. Please refer to FIG. 7, which is a schematic view of a projection system in accordance with a third embodiment of the present invention. As shown, the projection system 5 in the illustrated embodiment of FIG. 7 has a structure similar to that of the projection system 1 in the first embodiment of FIG. 1. The main difference between the two projection systems is that in the projection system 5, the light-guiding rod 56 has three light-capture interfaces. As shown, besides the first light source 18 and the second light source 20, the projection system 5 in the present embodiment further includes a third light source 22 which is configured to emit a third light 222. The structures and functions of the other elements/units in the projection system 5 have been described for the projection system 1 in FIG. 1, and no redundant detail is to be given herein. The light-guiding rod 56 in the present embodiment has a structure similar to that of the light-guiding rod 16 in the first embodiment. The main difference between the two light-guiding rods is that the first end 562 of the light-guiding rod 56 has a transmission surface 5622, a first reflection surface 5624 and a second reflection surface 5626. Specifically, the transmission surface 5622 is substantially perpendicular to the axial direction 56a of the light-guiding rod 56; the first reflection surface 5624 and the axial direction 56a have a first angle 5624a formed therebetween; the second reflection surface 5626 and the axial direction 56a have a second angle 5626a formed therebetween; the first reflection surface 5624 and the second reflection surface 5626 are adjacent and connected to the transmission surface 5622 and formed on the first side 5622a and the second side 5622b of the transmission surface 5622, respectively. The first light 182, emitted from the first light source 18, is incident into the light-guiding rod 56 through the transmission surface 5622. The second light 202, emitted from the second light source 20, is incident onto a first side surface 5628 of the light-guiding rod 56 and then is reflected into the light-guiding rod 56 through the first reflection surface 5624. The third light 222, emitted from the third light source 22, is incident onto a second side surface 5630 of the light-guiding rod 56 and then is reflected into the light-guiding rod through the second reflection surface 5626. Similarly, the light-guiding rod 56 homogenizes the first light 182, the second light 202 and the third light 222 therein and then transmits the homogenized lights to the image modulation device 14. In addition, same as the definition of the widths of the transmission surface 1622 and the first reflection surface 1624 in the projection system 1, the first reflection surface 5624 has a first width 5624b, the transmission surface 5622 has a second width 5622c and the second reflection surface 5626 has a third width 5626b. Similarly, the width ratio of the first width 5624b to the panel width 14a, the width ratio of the second width 5622c and the width ratio of the third width 5626b to the panel width 14a are all within a range from 0.13 to 0.35. Thus, more lights can be captured in the projection system 5, a higher light-output intensity is obtained at a second end 564 of the light-guiding rod 56 and a higher brightness is obtained in the projected image.

Additionally, in a practical application, each one of the first light source 18, the second light source 20 and the third light source 22 may be configured to emit a monochromatic light, such as a light emitting diode (LED) light source for emitting red, green or blue light. Thus, the light-guiding rod 56 may be configured to directly project the light with specific color (a monochromatic light or a mixed light) onto the image modulation device 14 without the employment of a color wheel, which is for filtering out the desired color light thereby reducing the power consumption in the light filtering process. It is understood that the projection system 5 may also adopt the two-light-source configuration of the projection system 4, and no redundant detail is to be given herein.

In the light-guiding rod 56 of the projection system 5, the first reflection surface 5624 and the transmission surface 5622 have an angle 5624c formed therebetween and the second reflection surface 5626 and the transmission surface 5622 have an angle 5626c formed therebetween. Both of the angles 5624c and 5626c are within a range from 180 degrees to 270 degrees. In one embodiment, both of the angles 5624c and 5626c are 225 degrees. Because the light intensity presents a Gaussian distribution and the digital micro-mirror device commonly used in industry has a ratio about 4:3, 16:10 or 16:9, the light-output surface (the cross-section of the second end 564 of the light-guiding rod 56) and the three light-input surfaces (the transmission surface 5622, the first reflection surface 5624 and the second reflection surface 5626) have the same height. In addition, the aforementioned three light-input surfaces may substantially have square shapes; thus, the higher-intensity and higher-homogenization light can be captured and directed into the light-guiding rod 56 more efficiently thereby increasing the light guiding efficiency of the light-guiding rod 56. The aforementioned three light-input surfaces disclosed in the present embodiment satisfy the following condition: $0.13 < W_{(1,2,3)}/W_P < 0.35$, where $W_P$ is the panel width 14a of the image modulation device 14; $W_1$ is the first width 5624b of the first reflection surface 5624; $W_2$ is the second width 5622c of the transmission surface 5622; $W_3$ is the third width 5626b of the second reflection surface 5626. In this embodiment, $W_1 = W_3 = \sqrt{2} W_2$. For example, if the panel width 14a is 24 mm, the height is 14 mm and the magnification of the lens 13 is 2.4, then the second width 5622c is about 24/2.4/3=3.33 mm, $W_2/W_P$ is about 0.139 and the transmission surface 5622 (width*height) is about 3.33*5.83 mm². If the magnification of the lens 13 is 1.4, then the second width 5622c is about 24/1.4/3=5.71 mm, the minimum $W_2/W_P$ is about 0.238 and the maximum $W_2/W_P$ is about 0.34.

Figure 8:
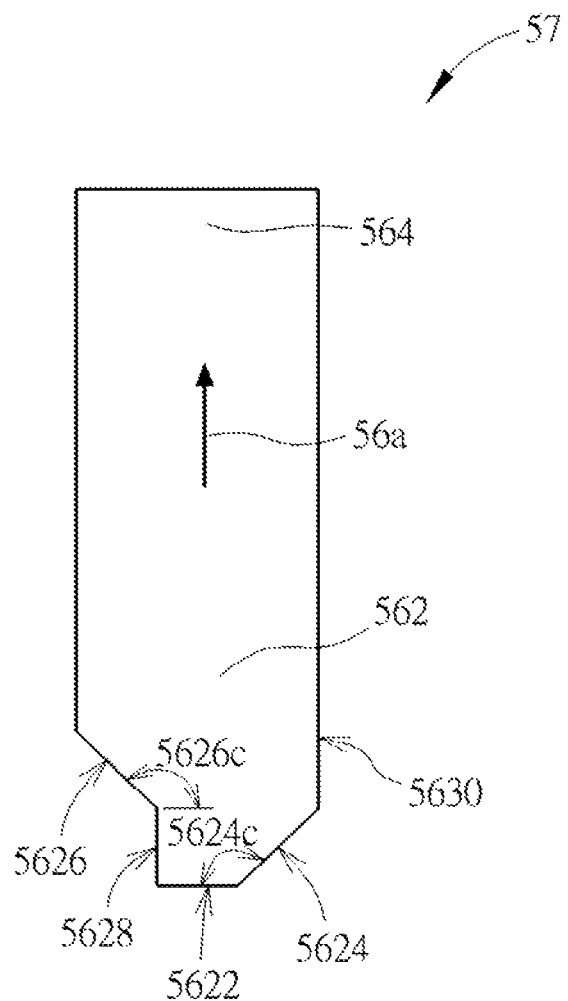
FIG. 8 is a schematic view of a light-guiding rod in accordance with another embodiment of the present invention.

In the projection system 5 of the third embodiment, the first reflection surface 5624 and the first side surface 5628 are formed on the same side of the transmission surface 5622, and the second reflection surface 5626 and the second side surface 5630 are formed on another same side of the transmission surface 5622; however, the present invention is not limited thereto. FIG. 8 is a schematic view of a light-guiding rod in accordance with another embodiment of the present invention. As shown, the light-guiding rod 57 in the present embodiment of FIG. 8 has a structure similar to that of the light-guiding rod 56 shown in FIG. 7. The main difference between the two light-guiding rods is that in the light-guiding rod 57, both of the angle 5624c, formed between the first reflection surface 5624 and the transmission surface 5622, and the angle 5626c, formed between the second reflection surface 5626 and the transmission surface 5622, are within a range from 90 degrees to 180 degrees. In one embodiment, both of the angles 5624c and 5626c are 225 degrees. As shown in FIG. 8, the first reflection surface 5624 and the first side surface 5628 are formed on opposite sides of the transmission surface 5622, respectively; the second reflection surface 5626 and the second side surface 5630 are also formed on opposite sides of the transmission surface 5622, respectively; and only the first reflection surface 5624 is adjacent and connected to the transmission surface 5622. In one embodiment, the first reflection surface 5624 is arranged not to be adjacent and connected to the transmission surface 5622, same as the arrangement configuration of the second reflection surface 5626, and thus no redundant detail is to be given herein. In addition, it is to be noted that in the light-guiding rods 56 and 57, the transmission surface 5622 is formed between the first reflection surface 5624 and the second reflection surface 5626; however, the present invention is not limited thereto. It is understood that the arrangement positions of the transmission surface 5622, the first reflection surface 5624 and the second reflection surface 5626 (for example, the position along the axial direction 56a and along a direction perpendicular to the axial direction 56a) are adjustable in response to the positions of the light sources. The adjustment of the arrangement positions can be easily done by those ordinarily skilled in the art after reviewing the description of the present disclosure, and no redundant detail is to be given herein.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection system, comprising:
   a projection lens, configured to project an image light;
   an image modulation device, comprising a panel width and configured to form the image light;
   a light-guiding rod, configured to receive and homogenize a plurality of lights, the light-guiding rod being defined with an axial direction and comprising a first end and a second end, the first end comprising a transmission surface and a first reflection surface formed on a first side of the transmission surface, a normal direction of the first reflection surface and the axial direction having a first angle formed therebetween, the transmission surface substantially being perpendicular to the axial direction, the first reflection surface comprising a first width, the transmission surface comprising a second width, both of a ratio of the first width to the panel width and a ratio of the second width to the panel width being from 0.13 to 0.35;
   a first light source, configured to emit a first light, the first light being emitted into the light-guiding rod through the transmission surface; and
   a second light source, configured to emit a second light, the second light being incident onto a first side surface of the light-guiding rod and reflected into the light-guiding rod through the first reflection surface,
   wherein the first light and the second light are homogenized by the light-guiding rod and transmitted to the image modulation device through the second end, and the projection lens projects the image light formed by the image modulation device.

2. The projection system according to claim 1, further comprising a third light source configured to emit a third light, the first end of the light-guiding rod further comprising a second reflection surface formed on a second side of the transmission surface, a normal direction of the second reflection surface and the axial direction having a second angle formed therebetween,
   wherein the third light is incident onto a second side surface of the light-guiding rod and is reflected into the light-guiding rod through the second reflection surface, and the first light, the second light reflected by the first reflection surface and the third light reflected by the second reflection surface are mixed by the light-guiding rod and then transmitted to the image modulation device through the second end.

3. The projection system according to claim 2, wherein the first side is opposite to the second side.

4. The projection system according to claim 3, wherein the first reflection surface and the second reflection surface are adjacent and connected to the transmission surface.

5. The projection system according to claim 2, wherein at least one of the first reflection surface and the second reflection surface is disposed to be adjacent to the transmission surface or is disposed not to be adjacent to the transmission surface.

6. The projection system according to claim 2, wherein each one of the first light, the second light and the third light is a monochromatic light.

7. The projection system according to claim 1, wherein a third angle from 90 degrees to 180 degrees is formed between the first reflection surface and the transmission surface.

8. The projection system according to claim 1, wherein the light-guiding rod further comprises a second side surface located opposite to the first side surface, and the first reflection surface is connected to the transmission surface and the second side surface.

9. The projection system according to claim 1, wherein a third angle from 180 degrees to 270 degrees is formed between the first reflection surface and the transmission surface.

10. The projection system according to claim 1, wherein the first reflection surface is connected to the transmission surface and the first side surface.

11. The projection system according to claim 1, further comprising:
    a fourth light source for emitting a fourth light;
    a first reflection member for reflecting the first light into the light-guiding rod through the transmission surface; and
    a second reflection member for reflecting the fourth light into the light-guiding rod through the transmission surface.

12. The projection system according to claim 1, further comprising:
    a fifth light source for emitting a fifth light;
    a third reflection member for reflecting the second light through the first side surface and onto the first reflection surface; and
    a fourth reflection member for reflecting the fifth light through the first side surface and onto the first reflection surface.

* * * * *